(12) United States Patent
Donze

(10) Patent No.: US 10,635,641 B1
(45) Date of Patent: *Apr. 28, 2020

(54) SYSTEM AND METHOD TO PROVIDE DOCUMENT MANAGEMENT ON A PUBLIC DOCUMENT SYSTEM

(71) Applicant: Altirnao, Inc., Wilmington, DE (US)

(72) Inventor: Stephane Donze, Walnut Creek, CA (US)

(73) Assignee: ALTIRNAO, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,786

(22) Filed: Sep. 20, 2016

Related U.S. Application Data

(63) Continuation-in-part of application No. 14/284,359, filed on May 21, 2014, now Pat. No. 9,817,988.

(60) Provisional application No. 61/826,456, filed on May 22, 2013.

(51) Int. Cl.
*G06F 16/00* (2019.01)
*G06F 16/176* (2019.01)
*G06F 16/93* (2019.01)
*G06F 16/11* (2019.01)

(52) U.S. Cl.
CPC ............ *G06F 16/176* (2019.01); *G06F 16/11* (2019.01); *G06F 16/93* (2019.01)

(58) Field of Classification Search
CPC .. G06F 21/6218; G06F 21/6272; G06F 16/11; G06F 16/93; G06F 17/30011; G06F 17/3007

See application file for complete search history.

(56) References Cited

U.S. PATENT DOCUMENTS

| | | | |
|---|---|---|---|
| 6,584,466 B1 | 6/2003 | Serbinis et al. | |
| 7,149,959 B1 | 12/2006 | Jones | |
| 2007/0033154 A1 | 2/2007 | Trainum | |
| 2007/0113187 A1 | 5/2007 | McMullen | |
| 2009/0319529 A1* | 12/2009 | Bartlett | G06F 21/6209 |
| 2010/0046029 A1 | 2/2010 | Zsuzuki et al. | |
| 2010/0241611 A1 | 9/2010 | Zuber | |
| 2010/0332401 A1 | 12/2010 | Prahlad et al. | |
| 2011/0153560 A1* | 6/2011 | Bryant | G06F 17/30011 707/610 |
| 2012/0137309 A1* | 5/2012 | Makam | G06Q 10/10 719/320 |
| 2012/0304262 A1 | 11/2012 | Cucco et al. | |
| 2013/0086060 A1 | 4/2013 | Donley et al. | |
| 2013/0219176 A1* | 8/2013 | Akella | H04L 63/0815 713/165 |
| 2013/0311894 A1 | 11/2013 | Rexer | |
| 2014/0165176 A1 | 6/2014 | Ow | |
| 2014/0229839 A1 | 8/2014 | Lynch et al. | |

* cited by examiner

*Primary Examiner* — Dinku W Gebresenbet
(74) *Attorney, Agent, or Firm* — DLA Piper LLP (US)

(57) ABSTRACT

A system and method for document management are provided in which documents are managed in a file/document sharing system. The document management system imports a file owned by a human user into the document management system by transferring ownership of the file from the human user to the document management system and setting access permissions in the public file system for the imported file.

15 Claims, 12 Drawing Sheets

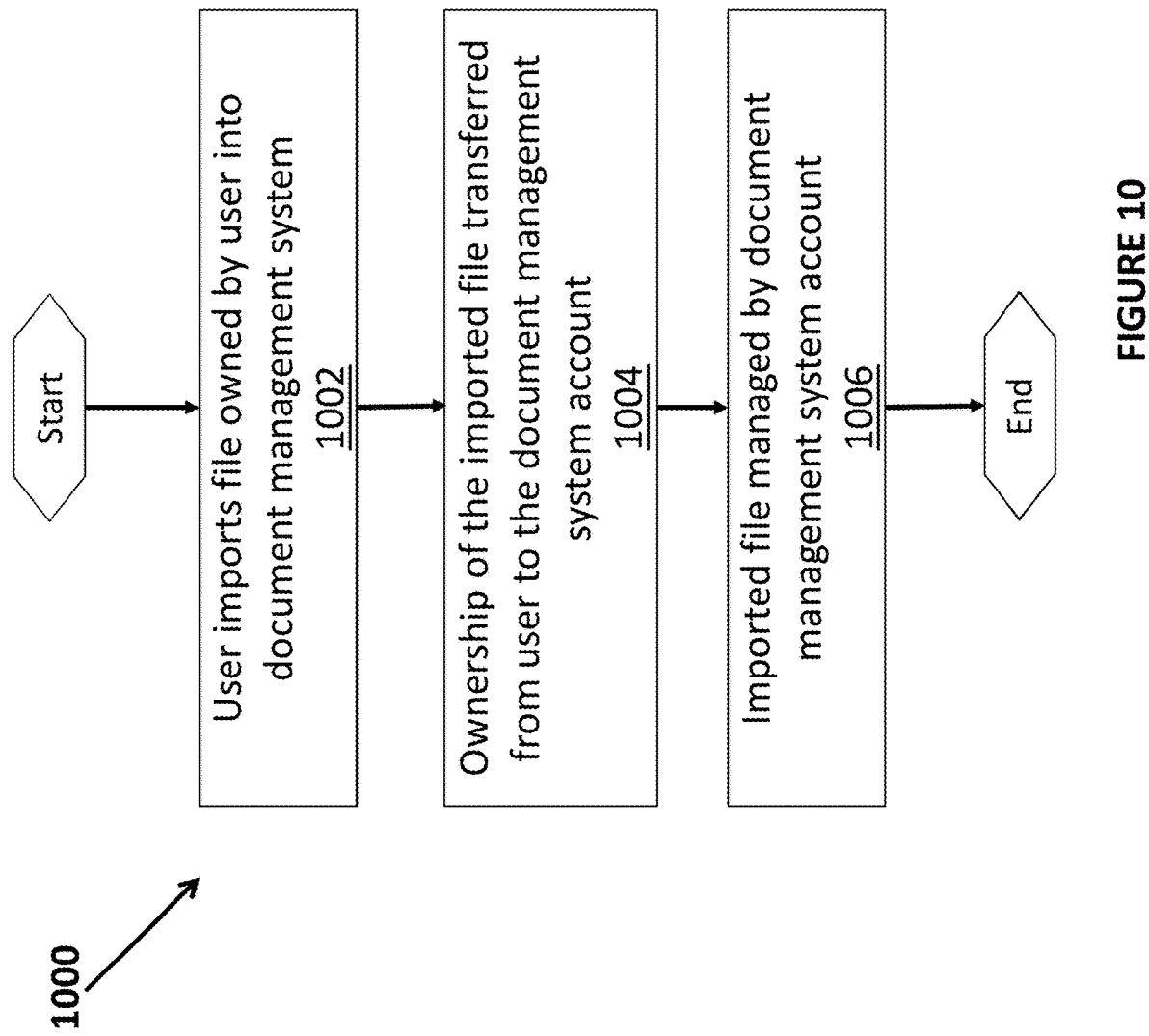

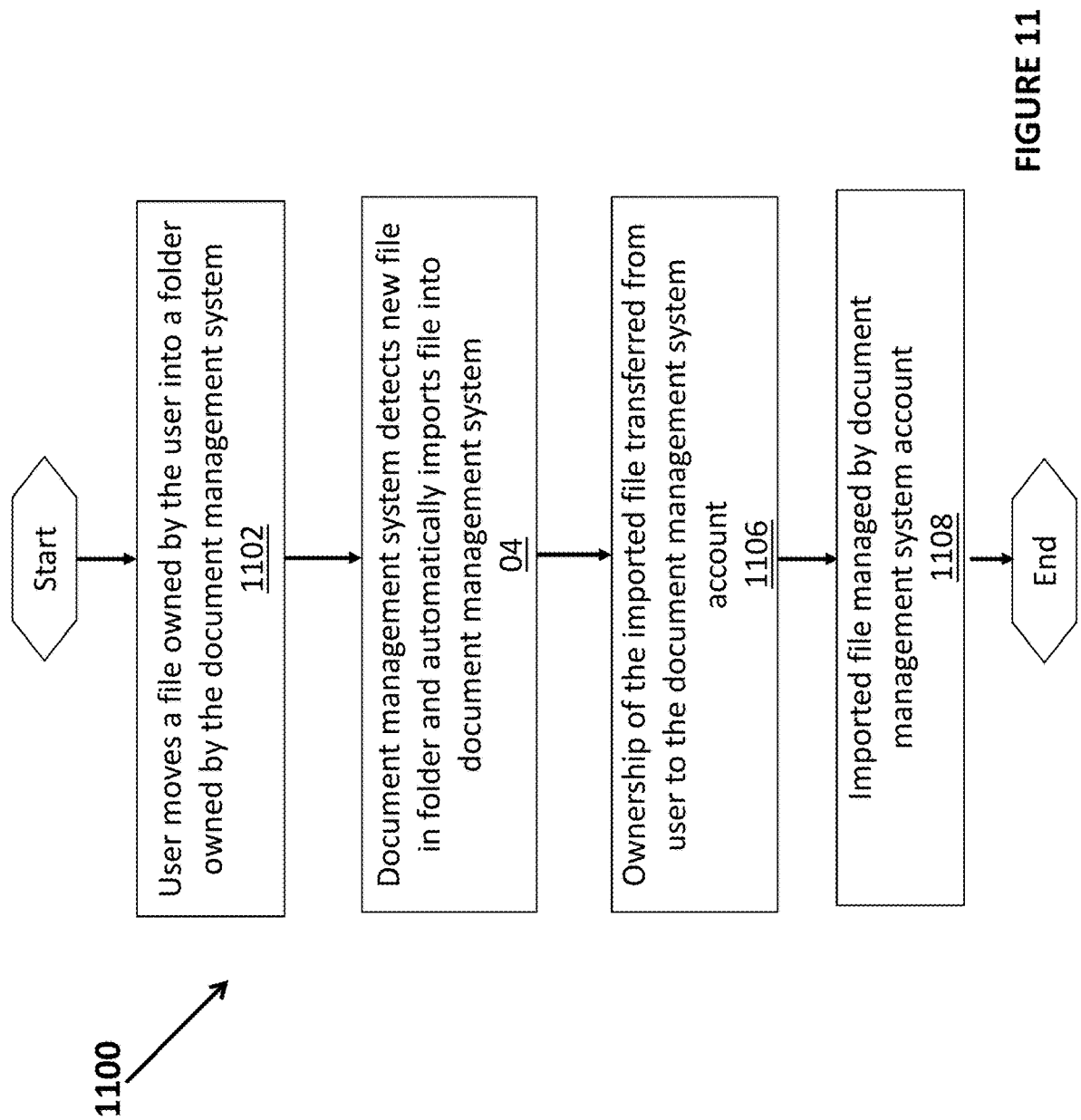

SYSTEM AND METHOD TO PROVIDE DOCUMENT MANAGEMENT ON A PUBLIC DOCUMENT SYSTEM

PRIORITY CLAIMS/RELATED APPLICATIONS

This application claims priority under 35 USC 120 and is a continuation in part of U.S. patent application Ser. No. 14/284,359, filed May 21, 2014 that is turn claims the benefit under 35 USC 119(e) of and claims priority under 35 USC 120 to U.S. Provisional Patent Application Ser. No. 61/826,456, filed on May 22, 2013 and entitled "System And Method To Provide Document Management On A Public Document System", the entirety of which is incorporated herein by reference.

FIELD

The disclosure relates generally to a system and method for document management in a public document system.

BACKGROUND

In most online public file systems such as Dropbox, Google Drive, SkyDrive, etc., files and/or documents are owned by individual people who are responsible for managing the sharing permissions of the document and/or file. Thus, each user decides which files and/or documents he or she wants to make public, which files and documents are private (visible only to the owner) and which files and/or documents may be shared with a limited set of users and/or groups.

This paradigm in which the files and/or documents are owned by the user is well suited for collaborative work among small teams, but does not scale up to large organizations with hundreds or thousands of users. In this paradigm, work-related documents that belong to the organization from a legal and intellectual property point of view, are "owned" in the document system by the individual users. Due to this ownership by an individual, critical information can be lost when an employee leaves the organization, or by accident when the owner deletes a file without realizing that it was shared and used by other co-workers.

There have been systems that have attempted to solve the above problems. One system is a cloud backup solutions, such as for example Backupify, that addresses the problem of accidental data loss by storing copies of the files outside of the public file system. When a document is lost, the backup system can restore the backup copy. Another system is a security audit solutions, such as for example CloudLock, that addresses the problem of controlling the sharing permissions of the files. These tool perform a periodic scan of the files and provide a detailed report of which file(s) are shared with which users or groups, with a specific focus on files that are made visible outside of the organization.

These known backup and audit solutions are only a partial answer to the problem of managing corporate documents for several reasons. First, these tools only detect and fix problems that have already happened, finding and restoring a lost file can take time and audit tools can only find security breaches after (and sometimes, a long time after) the misconfiguration has been done. In addition, backup copies may be sometimes incomplete (for example, a backup copy of a Google Document only contains the content of the document, but not the collaborative comments attached to it). Furthermore, these tools do not address the "ownership" issue, which is the root cause of the problems: despite the deployment of a centralized backup system and a security audit tool, files are still owned by individual users rather than by the organization.

BRIEF DESCRIPTION OF THE DRAWINGS

FIG. 10 illustrates a process for importing a file into the document management system from a graphical user interface; and FIG. 11 illustrates a process for importing a file directly via the public file system.

DETAILED DESCRIPTION OF ONE OR MORE EMBODIMENTS

The disclosure is particularly applicable to a cloud based document management system that interfaces with a public file system, such as Google Drive and it is in this context that the disclosure will be described. It will be appreciated, however, that the system and method has greater utility since the document management system may be used with various public file systems or file sharing systems and may be implemented in various ways that are known in the art.

Figure 1:
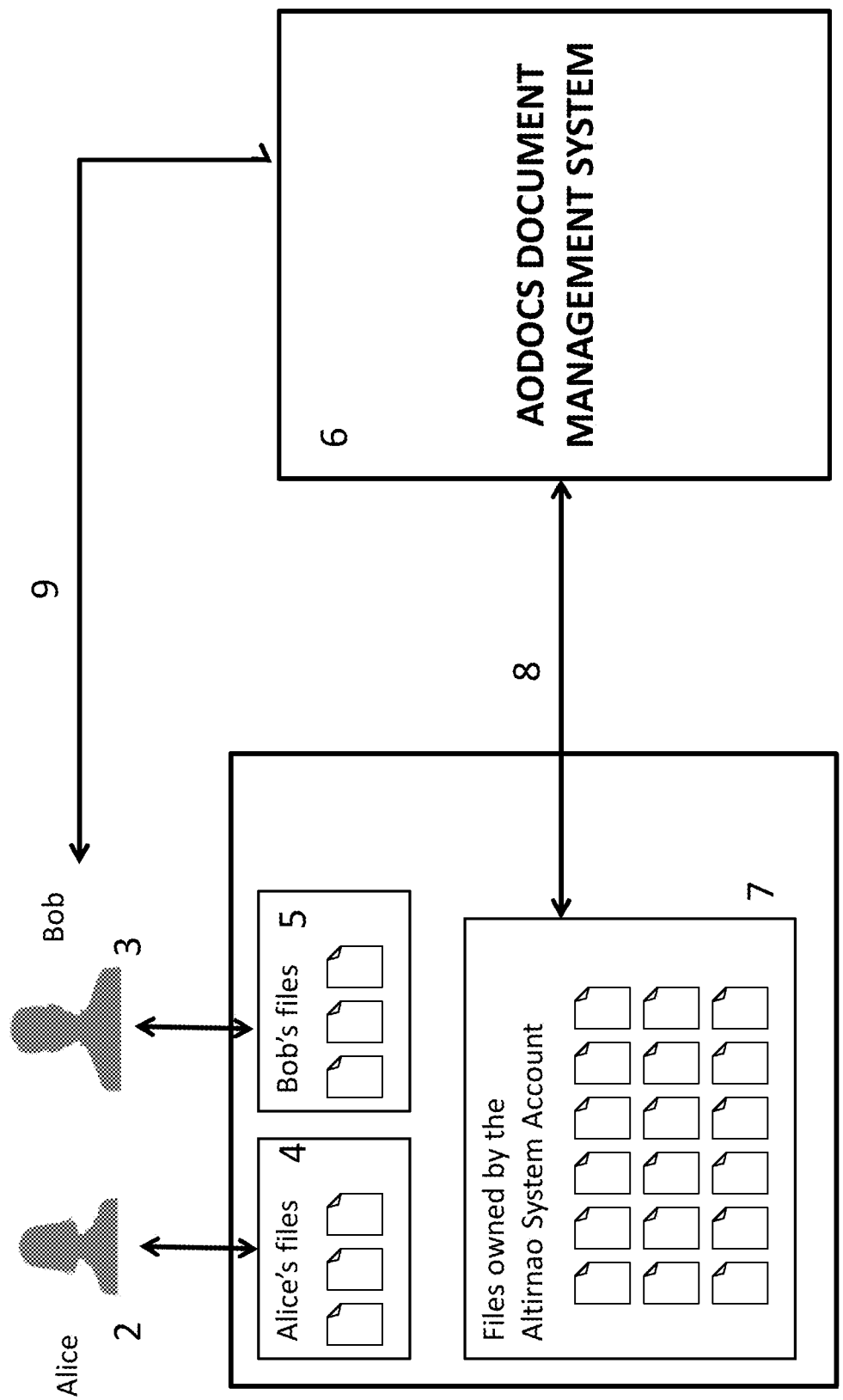
FIG. 1 illustrates an implementation of a document management system that works with a public document system.

FIG. 1 illustrates an implementation of a document management system 6 that works with a public document system 1 (that may also be a file sharing system.) In this implementation, the public file system may be a cloud computing based file sharing system, such as Google Drive for example, that may also provide online file storage. Two users of the public file system, such as Alice (2) and Bob (3) and can manage the files that they own (4), (5) within the public file system. If Alice and Bob are associated with a company and some of the files (4, 5) are company files, then the problem with this approach is that, when Bob or Alice leave the company, the company loses control and/or access to the files (4,5.) Thus, it is desirable to be able to allow users associated with a company to use the public file system and also allow the company to retain control over the files associated with each user. As shown in FIG. 1, a document management system 6, such as AODocs Document Management System for example, may be used in conjunction with the public file system 1. Each user, such as Alice and Bob as shown in FIG. 1, may access the public file system 1 using a computing device 202 (shown in FIG. 2A.) Each computing device may be a smartphone device, a phone device, a tablet computer, a personal computer, a terminal and other devices having at least a processor, memory, storage and circuitry for connectivity that allow the computing device to interact with the public file system 1 and the document management system 6. In some implementations, each computing device may store and execute a browser application that is used to interact with the public file system 1 and the document management system 6 is known manners using known protocols.

The document management system 6 may store one or more managed files (7) in the public file system 1 as shown. These one or more managed files (7) are "owned" by the document management system (6) on behalf of the company and thus those files can only be controlled (8) by the document management system (6.) When a user associated with the company wants to access a managed file (7), the user can not access those files directly, but instead needs to use an access point (9), such as an application programming interface (API), of the document management system (6). This ensures that, even when a user leaves the company, the company can still access and control the managed files (7) which means that a company can utilize the public file system while retaining control over the managed files (7.)

Figure 2A:
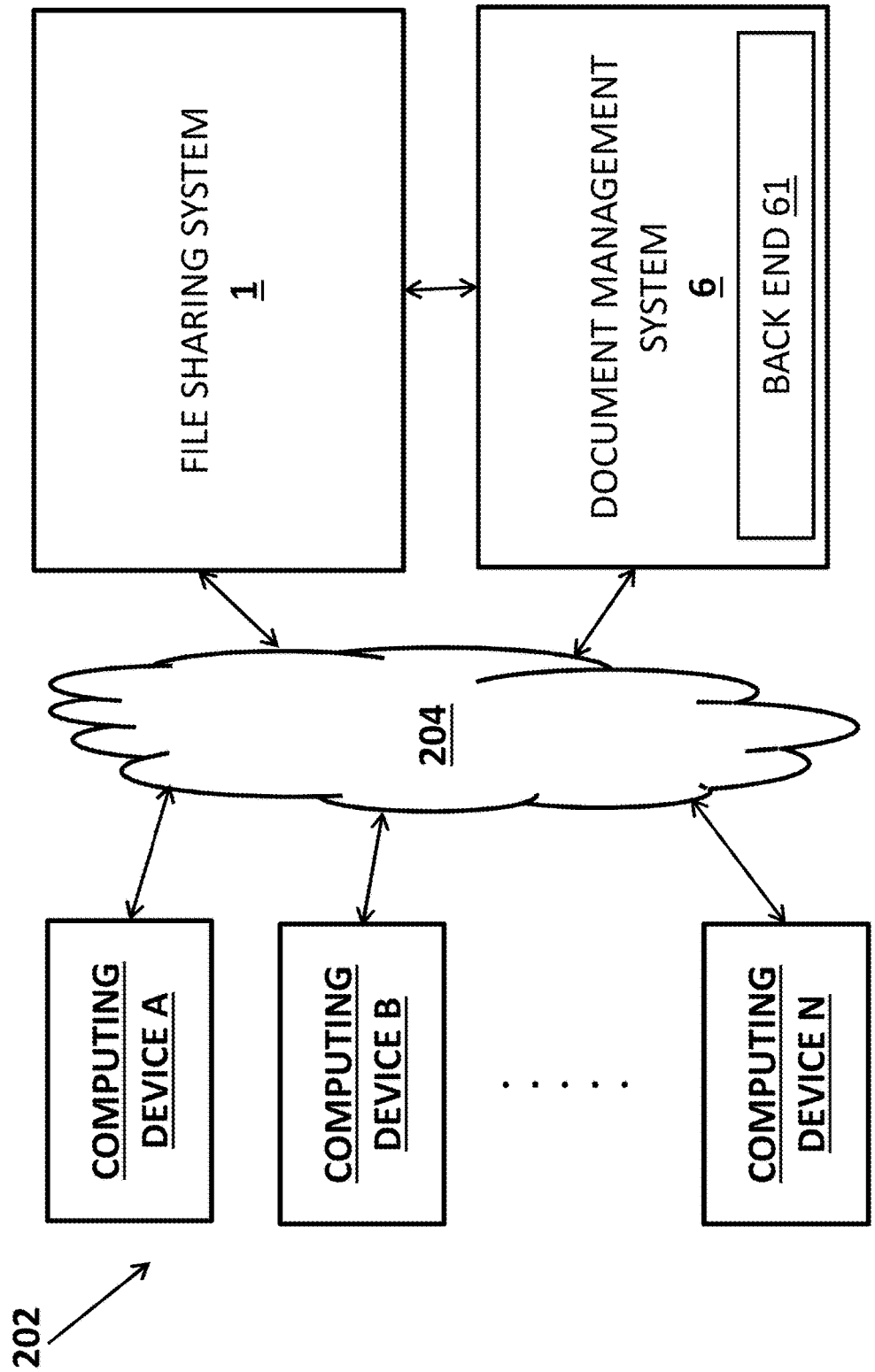
FIGS. 2A and 2B illustrate more details of the document management system in FIG. 1.
Figure 2B:
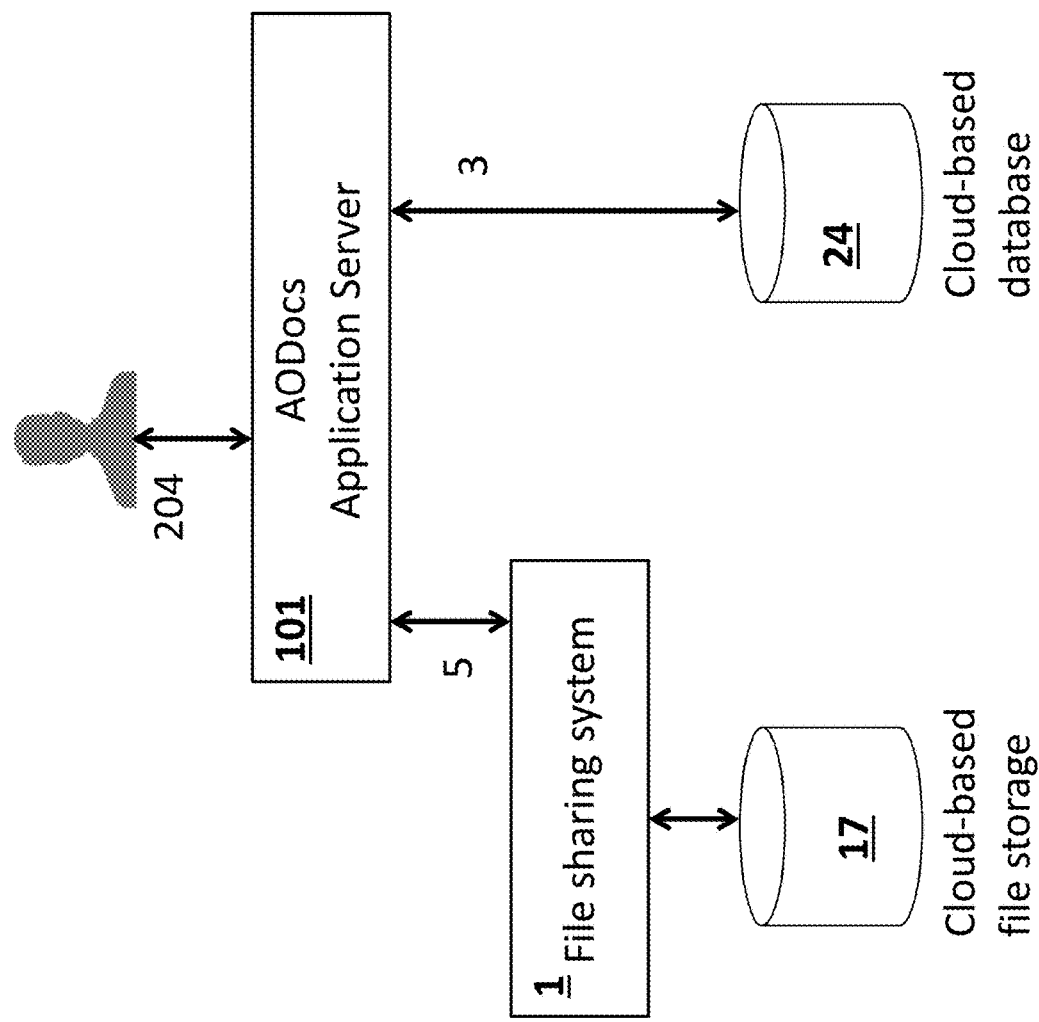

FIGS. 2A and 2B illustrate more details of the document management system in FIG. 1. As shown in FIG. 2A, the public file system 1 and the document management system 6 may be coupled to each other and then both may be coupled to a communications path 204 that allows each computing device 202, such as computing device A, computing device B, . . . , computing device N as shown in FIG. 2A, to interact with either the public file system or the document management system including the access point (9). The document management system 6 may be implemented using one or more cloud computing resources, one or more server computer and the like. In one implementation, the operations of the document management system 6 may be provided by a plurality of lines of computer code that executed on one or more processors of the one or more cloud computing resources or one or more server computers. The document management system 6 may also have a backend 61 that is described in more detail below with reference in FIG. 5. The public file system 1 also may be implemented using one or more cloud computing resources, one or more server computer and the like. In one implementation, the operations of the public file system 1 may be provided by a plurality of lines of computer code that executed on one or more processors of the one or more cloud computing resources or one or more server computers. The communications path 204 may be a wired or wireless path, such as the Internet, an Ethernet network, wireless data network, a computer network and the like.

As shown in FIG. 2B, each user may interact with a document management application server 101 (that is part of the document management system) using a Web browser and over the communications path 204. The server 101 may be running on the cloud-based infrastructure of the document management system described above. In one implementation, the application server may uses Google AppEngine (which is described in more detail at https://developers.google.com/appengine which is incorporated herein by reference.) The application server 101 may store the document properties (for the managed files 7 in FIG. 1) in a storage device (24), such as for example a cloud-based non-relational database. The document files may be stored in the storage (17) of the file sharing system, such as for example cloud based file storage. The public file system (1) has its own storage back-end (17), running on a cloud infrastructure. In one implementation, the storage device (24) may be a Google AppEngine Datastore and the storage of the public file system may use Google Drive (described in more detail at https://drive.google.com/start which is incorporated herein by reference.)

Figure 3:
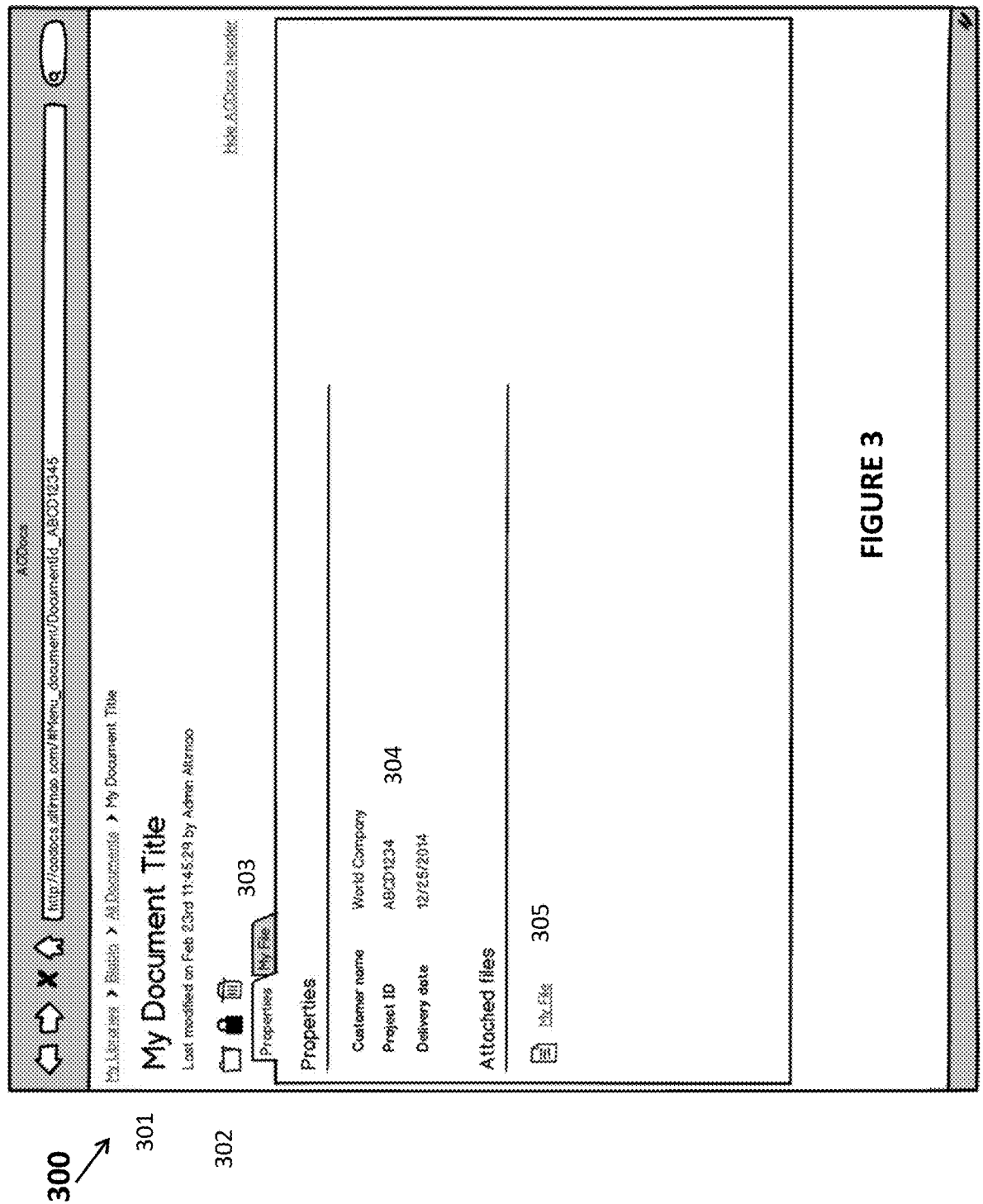
FIG. 3 illustrates an example of a document properties user interface of the document management system.
Figure 4:
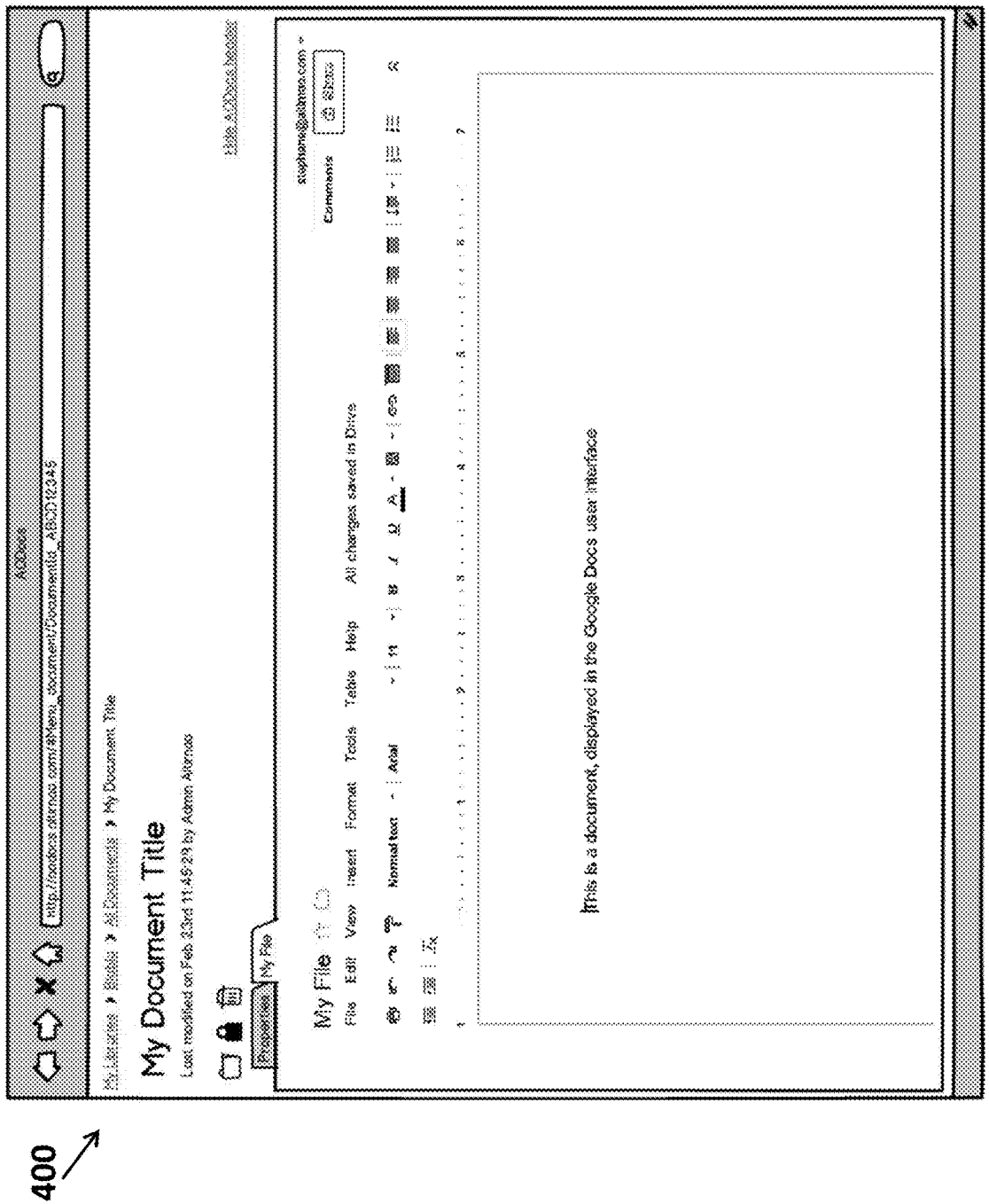
FIG. 4 illustrates an example of a document user interface of the document management system.

FIG. 3 illustrates an example of a document properties user interface 300 of the document management system and FIG. 4 illustrates an example of a document user interface 400 of the document management system. These user interfaces allow the user of the document management system to view the properties of a managed file (7) and also to view the file using, for example, a browser application as described above. In the document properties user interface in FIG. 3, a header (301) with the document title and last modified information may be displayed as well as a toolbar for document actions (302) such as edit the document, manage the document permissions, delete the document, etc. The document properties user interface may also have a tab panel (303) that allows the user to switch between the "Properties" view and the "File" view. In the "Properties" tab (as shown in FIG. 3), the document properties, such as customer name, project ID and delivery date for example, are displayed (304) and a list of the attached files (305) provide links to open the files stored in the public file system 1. In the "File" tab (shown in FIG. 4), the file content is displayed. In one implementation, the file may be displayed in a document viewer of the file sharing system.

Figure 5:
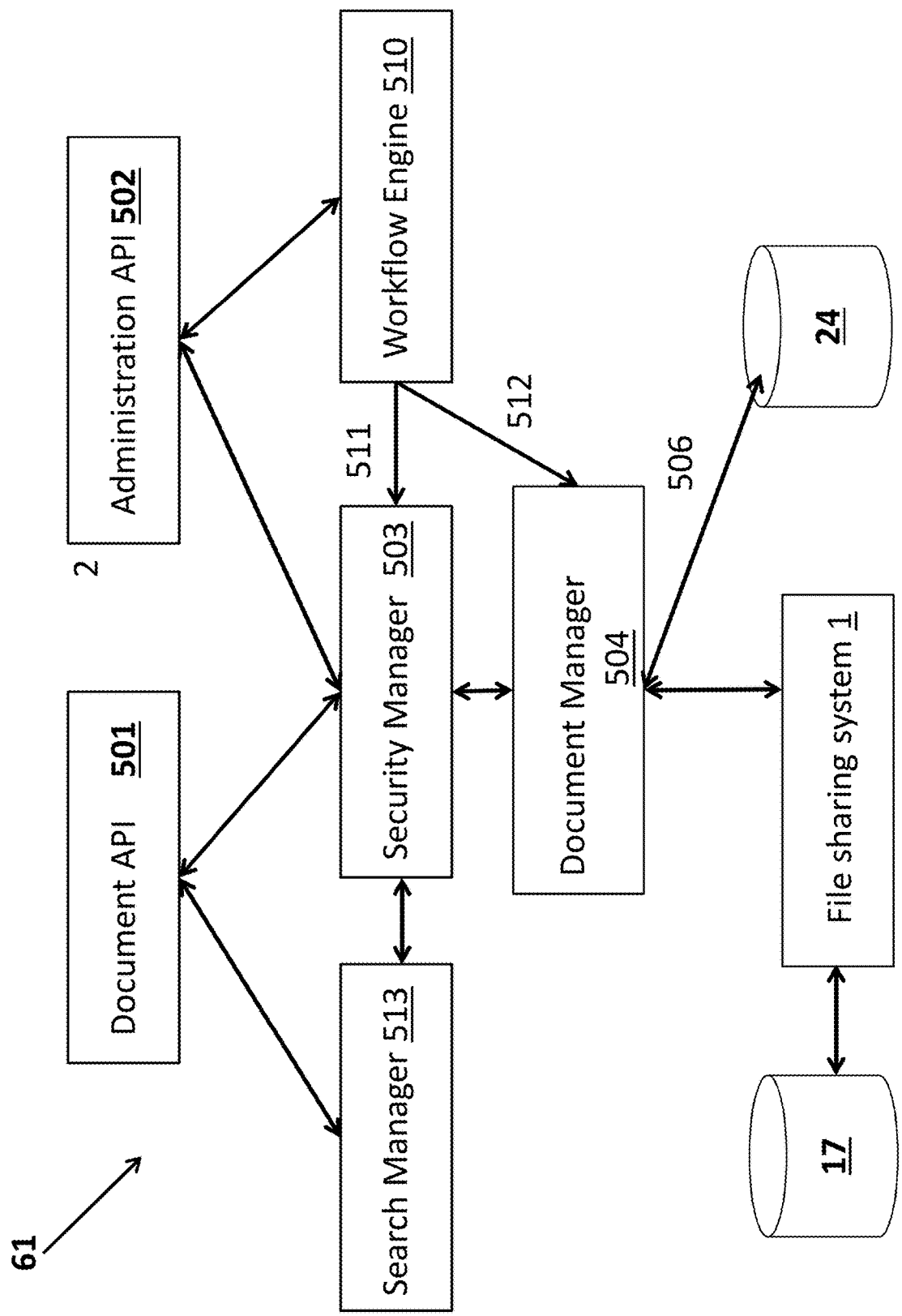
FIG. 5 illustrates more details of the document management system backend.

FIG. 5 illustrates more details of the document management system backend 61. The backend 61 may have two entry points including a document entry point 501, that may be implemented using an API, and an administration entry point 502 that may also be implemented using an API. Each component of the backend 61 shown in FIG. 5 may be implemented in a piece of hardware that may perform the operations described below or may be implemented in a plurality of lines of computer code that may be executed on the computer system(s) that implement the document management system. The document entry point 501 may process requests performed by end users when they use the system to interact with the files (such as, for example, view a document, update a document, get a list of documents, perform a search.) The administration entry point 502 may process requests performed by the administrators when they manage the configuration of the system (security parameters, database schema, workflow configuration, . . . ) The requests from the entry points may be provided to a security manager 503 of the backend 61. The security manager 503 may filter each request that includes verifying that the user performing the request has the permission to do so.

If the request is accepted, the security manager 503 may send the request to a document manager 504. The document manager 504 may manage the data model of the system. For example, the documents/files manipulated by the Document API are composed of: 1) properties (a.k.a. metadata) (506) stored in the storage 24 and 3) "attached files" which are stored in the underlying public file system 1 and its storage 17 described above. The Administration entry point 502 may be used to control the configuration of the security manager 503 and a workflow engine 510. The workflow engine can be used to automate document permissions 511 for the security manager 503 and document properties 512 for the document manager 504.

End users of the document management system may search for documents using the document entry point 501 which in turn passes the request to a search manager 513. The security manager 503 may filter the search results returned by the search manager 513 to ensure that the search results list displayed to the end user only shows documents that the particular end user is authorized to see.

Figure 6:
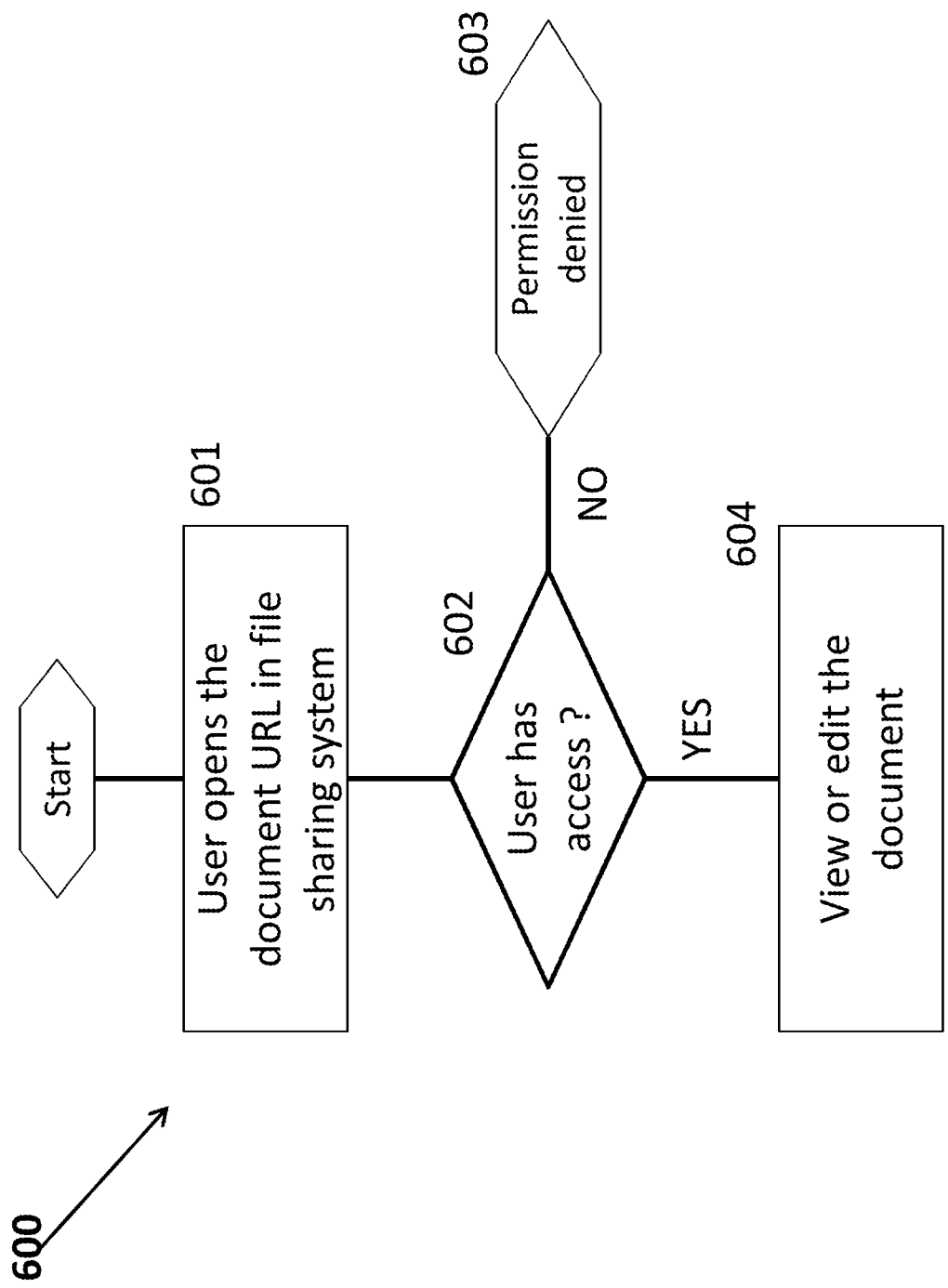
FIG. 6 is a flow chart of a user accessing a file owned by the document management system in the public file system.

FIG. 6 is a flow chart of a user accessing a file owned by the document management system method 600 in the file sharing system. Because the file is owned by document management system, the only actions that can be performed by the user are viewing the document or editing the document. The flow starts with the user opening the document's URL in the public file system 601. The file sharing systems first checks if the user is allowed to access the file 602 based on the permissions that have been set on this file by the document management system. If the user is denied access, an error message is displayed 603. If the user has access to the document, the user is allowed to performed the view or edit action 604 such as by using the user interface example in FIG. 4 described above.

Figure 7:
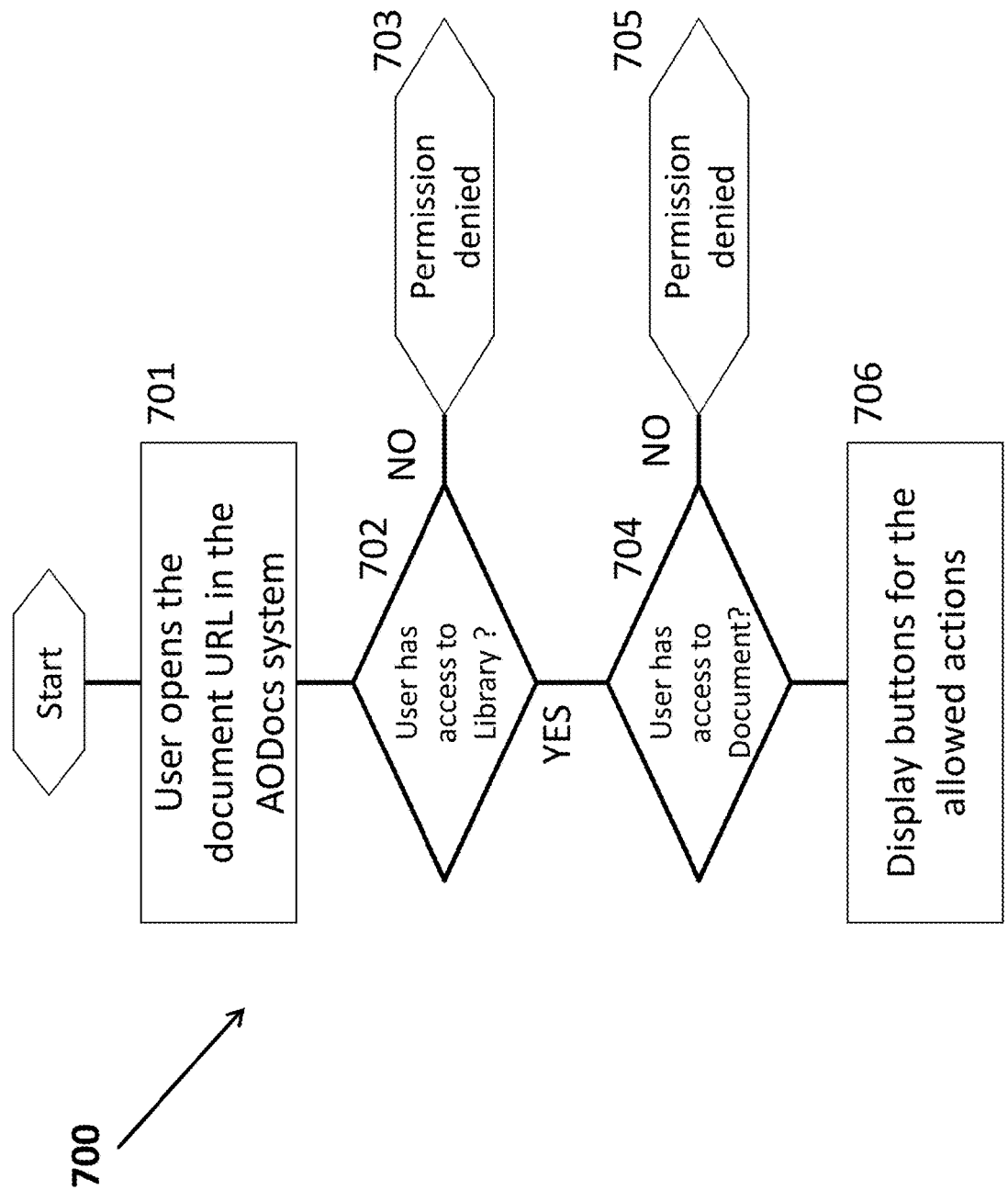
FIG. 7 is a flowchart of a user accessing a document through the document management user interface.

FIG. 7 is a flowchart of a method 700 for a user accessing a document through the document management user interface. The flow starts with the user opening the document's URL in the document management system (701). The document management system first checks if the user is allowed to access the Library containing the requested document (702). If the user is not allowed, the flow ends with an error message (703). The document management system then checks if the user is allowed to access the document (704). If the user is not allowed to access the document, the flow ends with an error message (705). If the user is allowed to access the document, the document management system determines which actions can be performed by the user and displays the corresponding action buttons (706) to the user.

Figure 8:
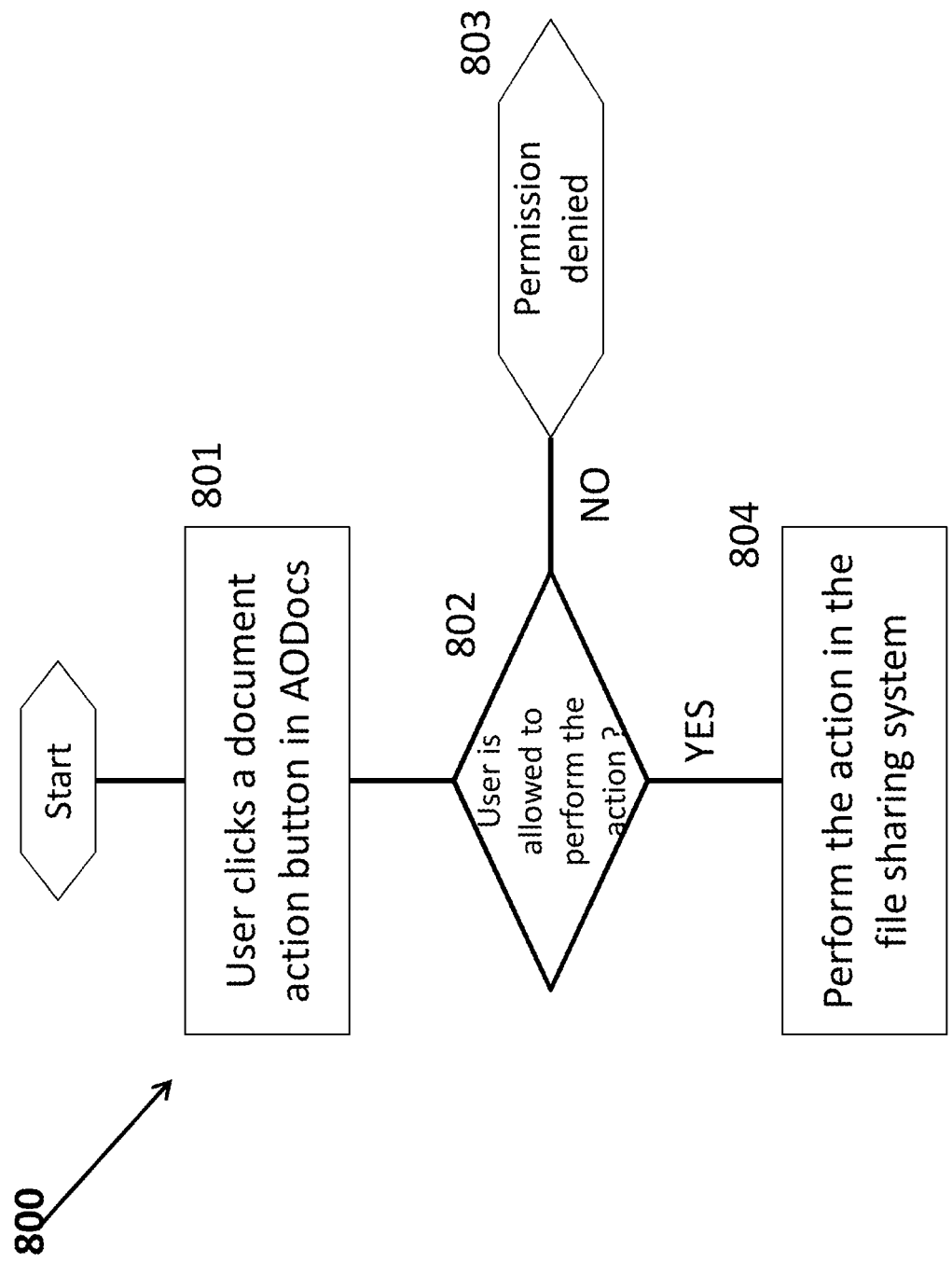
FIG. 8 is a flowchart of a user performing an action on a file through the document management user interface.

FIG. 8 is a flowchart of a method 800 for a user performing an action on a file through the document management user interface in which the action may be to modify a document's properties, delete a document, modify a document's permissions, etc. The flow starts with the user clicking on an action button (such as the buttons available at the end of the flow in FIG. 7 and shown in FIG. 3 or 4) (801). The document management system starts by verifying if the user is allowed to perform the action (702). If the action is not allowed, the flow ends with an error message (703). If the action is allowed, the document management system performs the requested action in the public file system (704) since the document management system is the owner of the particular file/document.

In a typical document management system, the attached files are stored directly in the document management system itself, using for example BLOB entries in a database. Typical document management systems also manage their own directory of users and groups to configure the document permissions. The document management system described above instead relies on an external public file system to manage the storage of attached files and the users and groups directory and the document management system manages the documents within the public file system by being the owner of the managed documents.

Figure 9:
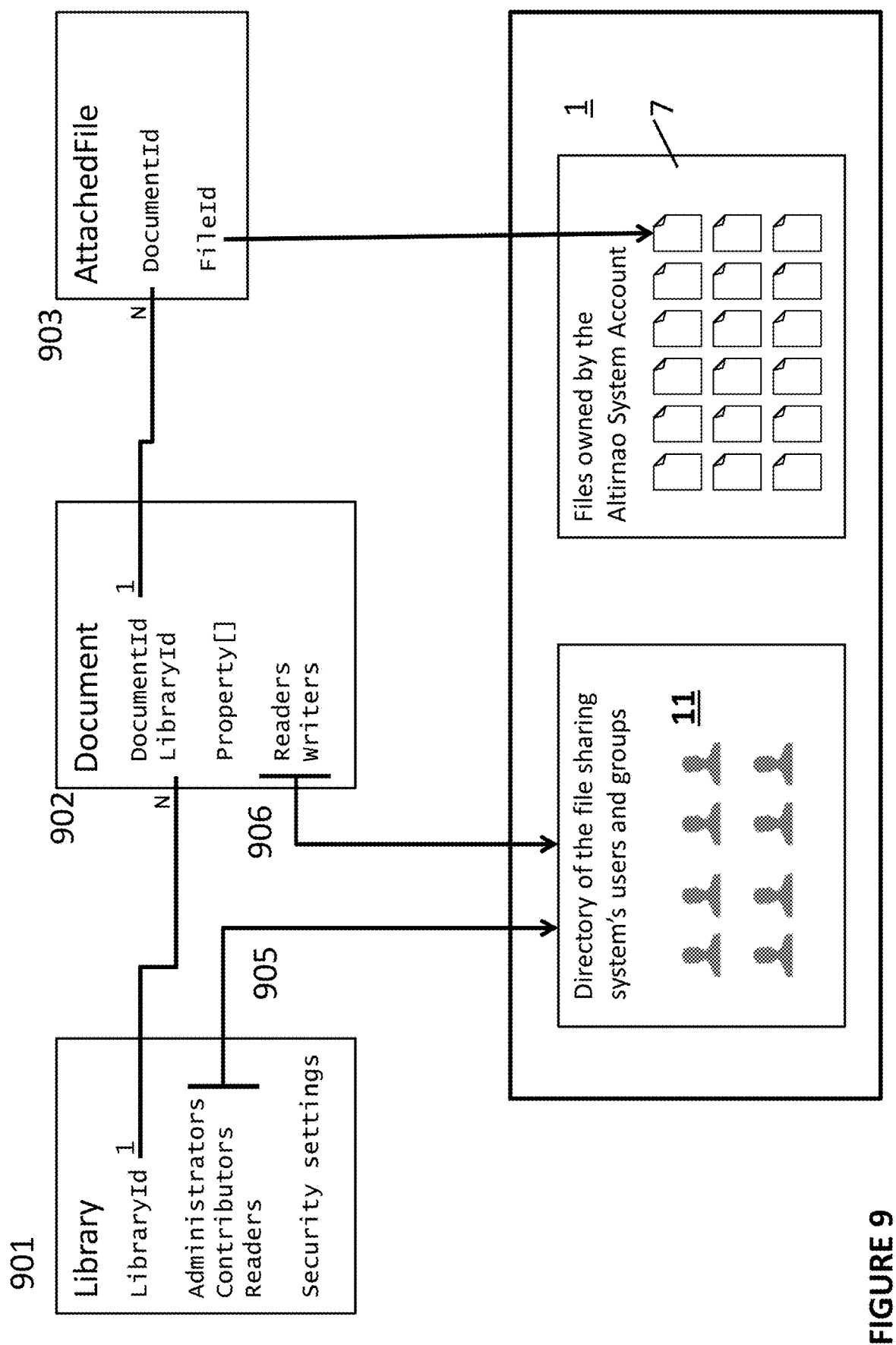
FIG. 9 illustrates a storage schema of the document management system.

FIG. 9 illustrates a storage schema 900 of the document management system. The data in the document management system may be stored as objects and the objects may include a library object 901, one or more documents objects 902 and one or more attached file objects 903. The library object 901 may be a collection of documents and has three system roles: Administrators (the users and groups who can configure the Library), Contributors (users and groups who can create and modify documents) and Readers (users and groups who can access documents). The library object may also store permissions settings for the different system roles of the collection of documents. The document object 902 may be a combination of properties (for example the title, customer name, expiration date, workflow state) and attached files for a particular managed document. Each document is related to one single library. A Document object also has security properties (Reader and Writer) indicating the users and groups having access to it. As described in FIG. 7, a user must be allowed to access to the Library (as a Library Reader, Contributor or Administrator) and be allowed to access to the document (as a Document Reader or Writer) to be able to open the document. The attached file object 903 may be a reference to a file in the file sharing system. The AttachedFile object may contain a FileId property that uniquely identifies the corresponding file object in the managed documents 7 of the public file system 1. The permissions in the document management system 6 may be synchronized with the public file system 1. As a result, the Library's system roles 905 and the Document's permission properties 906 are references to users and groups in the file sharing system's directory 11.

FIG. 10 illustrates a process 1000 for importing a file into the document management system so that a file that was originally owned by a user may be controlled by the document management system. As a result of the importing process, the file is owned by the document management system account associated with the document management system so that document management system controls the imported file's access permissions in the public file system in the same manner as described above. In the method, the user may import the file into the document management system (1002) using an interface, such as a graphical user interface of the document management system to select the file to be imported. When the file is imported, the ownership of the imported file is transferred (1004) from the user to the document management system account so that the file becomes a managed file whose access permissions are controlled by the document management system using the document management system account. This transfer of ownership of the file may occur by changing, in the public file system, the owner designated for the file to the document management system account. An example of the data that may be changed in the document management system for the file is shown in FIG. 9. Once the ownership of the file has been transferred to the document management system account, the document management system manages the imported file (1006). The management of the imported file, as described above, may include, for example, setting access permissions for the imported file.

FIG. 11 illustrates a process 1100 for importing a file directly via the public file system so that a file that was originally owned by a user may be controlled by the document management system. As a result of the importing process, the file is owned by the document management system account associated with the document management system so that document management system controls the imported file's access permissions in the public file system in the same manner as described above. In the method, a user may move a file owned by the user into a folder owned by the document management system account (1102) using a public file system interface. The document management system may automatically detect the new file in that folder and automatically imports the file into the document management system (1104). When the file is imported, the ownership of the imported file is transferred (1006) from the user to the document management system account so that the file becomes a managed file whose access permissions are controlled by the document management system using the document management system account (1108). This transfer of ownership of the file may occur by changing, in the public file system, the owner designated for the file to the document management system account. An example of the data that may be changed in the document management system for the file is shown in FIG. 9.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system, comprising:
a computer system having a processor, a memory and a public file system having a plurality of files stored by the public file system, each file having a single an owner and read access permissions and write access permissions wherein the read access permissions and the write access permissions are set only by the owner, the public file system having a document management system account and a directory of users, wherein each user is an owner of one or more files in the public file system;
at least one first file stored in the public file system wherein a human user owns the at least one first file and sets the read and write access permissions in the public file system for the at least one first file;
at least one second file stored in the public file system wherein the document management system account owns the at least one second file and sets the read and write access permissions in the public file system for the at least one second file;
a computer system having a processor, a memory and a document management system running outside of the public file system, the document management system controlling the document management system account and having a database with one or more objects including a document object for the at least one second file, the document object storing the read access permissions for the at least one second file listing one or more user of the public file system, contained in the directory of users, that have read access to the at least one second file and the write access permissions for the at least one second file listing one or more user of the public file system, contained in the directory of users, that have write access to the at least one second file, the document management system synchronizing the read access permissions and write access permissions for the at least one second file with the public file system;
the document management system importing a third file owned by a human user into the document management system by transferring ownership of the third file from the human user to the document management system account; and
the document management system account setting read and write access permissions in the public file system for the third file, synchronizing the read and write access permissions for the third file with the public file system and controlling access in the public file system by a human user to the third file based on the synchronized read and write access permissions of the third file set by the document management system account.

2. The system of claim 1, wherein the public file system is a public file sharing system.

3. The system of claim 1, wherein the document management system has a backend component.

4. The system of claim 3, wherein the backend component further comprises a security manager that controls the access to the at least one second file and the third file.

5. The system of claim 4, wherein the backend component further comprises a workflow engine.

6. The system of claim 1, wherein the document management system has a user interface that the human user uses to import the file and transfer the ownership of the file owned by the human user.

7. The system of claim 1, wherein the public file system has a user interface that the human user uses to import the file and transfer the ownership of the file owned by the human user.

8. A method for importing a file from a public file system to a document management system, comprising:
providing a public file system having a plurality of files stored by the public file system, each file having a single owner and read access permissions and write access permissions wherein the read access permissions and the write access permissions are set only by the owner, the public file system having a document management system account and a directory of users, wherein each user is an owner of one or more files in the public file system;
providing a document management system running outside of the public file system, the document management system controlling a document management system account and having a database with one or more objects including a document object for a file owned by the document management system account, the document object storing the read access permissions for the file listing one or more user of the public file system and the write access permissions for the file listing one or more user of the public file system;
receiving a file owned by a human user stored by a public file system, the human user of the received file setting the read access permissions and write access permissions in the public file system;
transferring the ownership of the received file stored in the public file system from the human user to the document management system account of a document management system;
setting, by the document management system account, read and write access permission in the public file system for the received file;
synchronizing the read and write access permissions for the received third file whose ownership is transferred to the document management system account with the public file system; and
controlling, by the document management system using the document management system account for the received file whose ownership is transferred to the document management system account, access in the public file system by a human user to the received file whose ownership is transferred to the document management system account stored by the public file system based on the synchronized read and write access permissions of the received file.

9. The method of claim 8, wherein the public file system is a public file sharing system.

10. The method of claim 8 further comprising receiving, at the document management system, a request to open the received file in the public file system and determining, by the document management system, if the request to open the received file is valid.

11. The method of claim 8 further comprising receiving, at the document management system, a request to access the received file in the document management system and determining, by the document management system, if the request to access the received file is valid.

12. The method of claim 11 further comprising displaying one or more document action buttons if the request to access the received file is valid.

13. The method of claim 12 further comprising receiving a request, at the document management system, to perform an action on the received file, determining if the request to perform the action is valid and performing, in the public file system, the action if the request to perform the action is valid.

14. The method of claim 8 further comprising selecting the file owned by the human user from a user interface of the document management system and requesting import of the selected file to transfer the ownership of the file owned by the human user to the document management system account.

15. The method of claim 8 further comprising moving the file owned by the human user into a folder owned by the document management system account, detecting, by the document management system, that the file owned by the human user is in the folder and automatically importing, by the document management system, the file owned by the human user to the document management system to transfer the ownership of the file owned by the human user to the document management system account.

\* \* \* \* \*